United States Patent
Kreiberg

(10) Patent No.: US 9,327,215 B2
(45) Date of Patent: May 3, 2016

(54) THICKENER/CLARIFIER DRIVE APPARATUS AND METHODS THEREOF

(71) Applicant: FLSmidth A/S, Valby (DK)

(72) Inventor: Michael Anthony Robert Kreiberg, Magna, UT (US)

(73) Assignee: FLSMIDTH A/S (DK)

( * ) Notice: Subject to any disclaimer, the term of this patent is extended or adjusted under 35 U.S.C. 154(b) by 0 days.

(21) Appl. No.: 14/427,047

(22) PCT Filed: Oct. 15, 2013

(86) PCT No.: PCT/DK2013/050332
§ 371 (c)(1),
(2) Date: Mar. 10, 2015

(87) PCT Pub. No.: WO2014/067525
PCT Pub. Date: May 8, 2014

(65) Prior Publication Data
US 2015/0224425 A1    Aug. 13, 2015

(30) Foreign Application Priority Data
Oct. 30, 2012 (DK) .............................. 2012 70665

(51) Int. Cl.
*B01D 21/20* (2006.01)
*F16H 57/02* (2012.01)
*F16H 1/28* (2006.01)

(52) U.S. Cl.
CPC .............. *B01D 21/20* (2013.01); *F16H 1/2845* (2013.01); *F16H 57/02004* (2013.01); *F16H 2057/02069* (2013.01)

(58) Field of Classification Search
CPC ........ B01D 21/06; B01D 21/04; B01D 21/18; B01D 21/20; F16C 2361/61; F16H 57/02004; F16H 2057/02069
USPC ............ 210/803, 523, 528, 531, 541; 74/413, 74/421 A, 421 R
See application file for complete search history.

(56) References Cited

U.S. PATENT DOCUMENTS

| | | | | |
|---|---|---|---|---|
| 2,837,215 A | * | 6/1958 | Chelminski | ............ B01D 21/20 210/531 |
| 2,931,241 A | * | 4/1960 | Scott | ...................... B01D 21/20 74/411 |

(Continued)

*Primary Examiner* — Christopher Upton
(74) *Attorney, Agent, or Firm* — Jeffrey A. Sharp; Matthew R. Weaver; Aaron M. Pile

(57) ABSTRACT

Disclosed, is a drive (101) for a sedimentation tank (1000) comprising a main ring gear (160) operatively connected to a cage (150) via a web portion (152). A bearing transfer ring (170) is provided to the web portion (152) such that a gap (172) is provided between the bearing transfer ring (170) and the main ring gear (160). The bearing transfer ring (170) is connected to a first bearing race (144) which communicates with a second bearing race (142) that is fastened to a base portion (136) of the drive (101). Torque (T) is delivered to the cage (150) to turn a rake assembly (1002). The gap (172) provides clearance for deflections, distortions, or deformations of the main ring gear (160) caused by bending stresses (B) in the main ring gear (160) may. The bearing transfer ring (170) absorbs stresses imparted to the main ring gear (160) and prevents fasteners (188) connected to stiff bearing races (144) from shearing. Also disclosed is a retrofit kit for a sedimentation tank drive, a sedimentation tank (1000) having a drive (101) according to the above description, and a method of thickening/clarifying slurry (1008) utilizing a drive (101) according to the above description.

10 Claims, 7 Drawing Sheets

(56) References Cited

U.S. PATENT DOCUMENTS

| | | |
|---|---|---|
| 3,390,782 A | 7/1968 | Liebowitz |
| 3,498,468 A | 3/1970 | Raynor |
| 3,704,789 A | 12/1972 | Jablon et al. |
| 3,959,151 A * | 5/1976 | Liebowitz .............. B01D 21/06 210/528 |
| 4,118,321 A * | 10/1978 | Bogen .................... B01D 21/18 210/531 |
| 5,194,155 A * | 3/1993 | Schwartz ............... B01D 21/20 210/528 |
| 5,264,126 A * | 11/1993 | Shurtleff ................ B01D 21/20 210/528 |
| 5,481,789 A * | 1/1996 | Thomas ................. B01D 21/06 29/402.08 |
| 6,467,968 B1 * | 10/2002 | Young ................... B01D 21/20 210/528 |

\* cited by examiner

THICKENER/CLARIFIER DRIVE APPARATUS AND METHODS THEREOF

BACKGROUND OF THE INVENTION

This invention relates to liquid/solid separation equipment used in the industrial, municipal, waste, tailings, chemical, and minerals processing technologies, and more particularly to mechanical drive means for sedimentation tanks used for thickening and clarifying slurry, and methods thereof.

Slurry 1008 entering a sedimentation tank 1000 typically comprises particles (solid sediments) which are suspended within a liquid fraction. The sedimentation tank 1000 serves to thicken or clarify the slurry 1008. In some instances, the sedimentation tank 1000 may agglomerate the suspended particles using flocculent, thereby allowing the sediments to settle to the bottom 1006 of the tank and form sludge. The sludge is driven to a central lower outlet 1010 in the tank using a rotating rake assembly 1002. Typically, a centrally-located drive having one or more motors turns the rake assembly 1002. The drive may be mounted to a center pillar 1012, or may otherwise be mounted to a bridge 1004 spanning a radius or entire diameter of the sedimentation tank 1000.

Conventional drive designs are limited in the amount of torque that they can handle. Accordingly, if too much sludge builds up at the bottom 1006 of a sedimentation tank 1000, resistance to the rake assembly 1002 increases, and can place large bending stresses on the main ring gear 60 of the drive 1.

OBJECTS OF THE INVENTION

It is, therefore, an object of the invention to provide an improved sedimentation tank drive capable of delivering high torques while still maximizing service life and reducing maintenance intervals.

It is yet another object of the invention to reduce or completely eliminate bolt breakage at high torque levels in sedimentation tank drives.

These and other objects of the invention will be apparent from the drawings and description herein. Although every object of the invention is believed to be attained by at least one embodiment of the invention, there is not necessarily any one embodiment of the invention that achieves all of the objects of the invention.

SUMMARY OF THE INVENTION

A drive for a sedimentation tank comprises a main ring gear operatively connected to a cage or a shaft when mounted to a bridge via a web portion. A bearing transfer ring is provided to the web portion. A gap is provided between the bearing transfer ring and the main ring gear. The bearing transfer ring is connected to a first bearing race. In some embodiments, the first bearing race may be in operable communication with a second bearing race that is mounted to a base portion of the drive. In some embodiments, the main ring gear may comprise a mating portion which abuts a complimentary mating portion of a spacer. In some embodiments, a spacer may be provided on the web portion and positioned between a portion of the main ring gear and a portion of the bearing transfer ring. The spacer may serve to maintain an upper portion of the gap between the main ring gear and the bearing transfer ring during deflection, distortion, or deformation of the main ring gear. In some embodiments, the first bearing race may comprise a mating portion which abuts a complimentary mating portion provided on the bearing transfer ring. In some embodiments, a mating portion of the main ring gear may abut a mating portion of the first bearing race. In some embodiments, a spacer may be provided on the first bearing race and positioned between a portion of the main ring gear and a portion of the bearing transfer ring, in order to maintain a lower portion of the gap between the main ring gear and the bearing transfer ring during deflection, distortion, or deformation of the main ring gear. In some embodiments, the web portion may comprise a first set of apertures configured to receive fasteners which connect the bearing transfer ring to the web portion. In some embodiments, the web portion may comprise a second set of apertures configured to receive fasteners which connect the main ring gear to the web portion. In some embodiments, the first bearing race may comprise a set of apertures configured to receive fasteners which connect the first bearing race to the bearing transfer ring. In some embodiments, a second bearing race operatively communicating with the first bearing race may comprise a set of apertures configured to receive fasteners which connect the second bearing race to a base portion of the drive.

A method of thickening/clarifying slurry is also disclosed. The method comprises providing a drive which is operatively connected to a rake assembly via a cage; wherein the drive comprises a main ring gear operatively connected to the cage via a web portion. A bearing transfer ring is provided to the web portion such that a gap is formed between the bearing transfer ring and the main ring gear. The bearing transfer ring is connected to a first bearing race. The method further includes the steps of providing power to the drive thereby subjecting the main ring gear to torque and bending stresses; transferring an amount of said torque to the cage in order to move the rake assembly connected thereto; and transferring an amount of said bending stresses to the bearing transfer ring and the first bearing race during deflection, distortion, or deformation of the main ring gear.

A retrofit kit for modifying an existing sedimentation tank drive is also disclosed. The kit comprises a bearing transfer ring which is configured to be operatively connected to a web portion extending between a main ring gear and a cage. The bearing transfer ring is further configured to be operatively connected to a first bearing race (e.g., via one or more fasteners). In use, a gap (e.g., which may be any clearance greater than zero or press fit, for instance, 0.005 inches) is formed between the bearing transfer ring and the main ring gear, eliminating direct connection between the main ring gear and the first bearing race. Moreover, the bearing transfer ring is configured to transfer bending stresses from the main ring gear through the web portion and to the first bearing race during deflection, distortion, or deformation of the main ring gear.

A sedimentation tank is also disclosed. The sedimentation tank comprises a rake assembly driven by a drive, which is operatively connected to the rake assembly via a cage. The drive comprises a main ring gear which is operatively connected to the cage via a web portion. A bearing transfer ring is provided to the web portion of the drive, such that a gap is formed between the bearing transfer ring and the main ring gear. The bearing transfer ring is connected to a first bearing race. The drive may be mounted to a center pillar, or may otherwise be mounted to a bridge which spans a radius or entire diameter of the sedimentation tank.

DETAILED DESCRIPTION OF THE INVENTION

Figure 1:
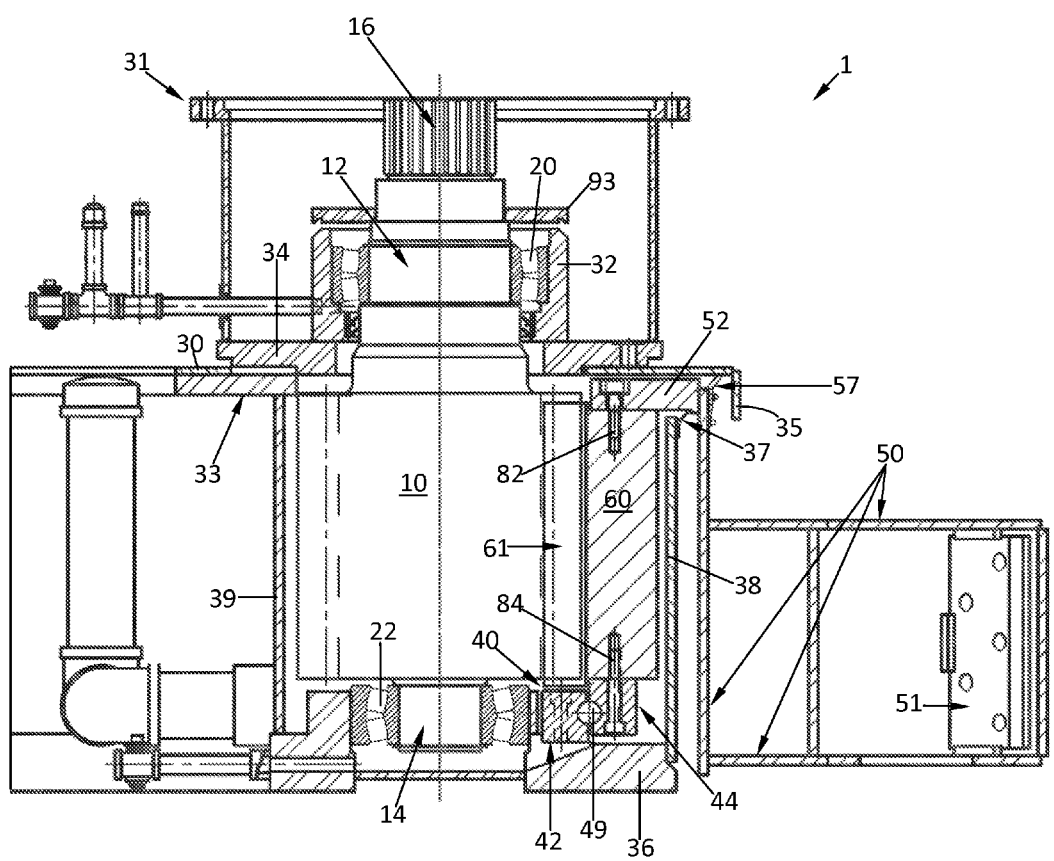
FIG. 1 illustrates a cross sectional view of a conventional sedimentation tank drive.

FIG. 1 shows a cross sectional view of a prior sedimentation tank drive 1. The drive 1 comprises several pinions 10 which drive a main ring gear 60 at a mesh zone 61. Each pinion 10 comprises an upper first spindle portion 12, a lower second spindle portion 14, and a torque surface 16 to which powered rotational input means (such as an electric motor having a reducer) can apply a rotational input to the pinion 10. The pinion rests in an upper first bearing 20 and a lower second bearing 22. A bearing block 32 seats/houses the first bearing 20, and a base portion 36 of the drive 1 seats/houses the second bearing 22.

A cover plate 30 provides an upper mounting surface to the drive 1. Reducer mounts 31 may be provided to the drive 1 to facilitate mounting of the powered rotational input means. A reducer abutment plate 93 may be used to limit the stopping depth of the reducer (not shown) and align the torque surface 16 with complimentary components (e.g., planet gears in the reducer). The reducer mounts 31 comprise a lower mounting portion 34. An upper seat portion 33 supports the cover plate 30. A web portion 52 which connects the main ring gear 60 to a cage 50 rotates with respect to the base portion 36 of the drive 1. The main ring gear 60 is directly bolted, via one or more fasteners 84, to an outer race 44 of a third bearing 40. The outer race 44 communicates with an inner race 42, wherein a plurality of bearing rollers 49 are disposed between the inner 42 and outer 44 races.

Figure 8:
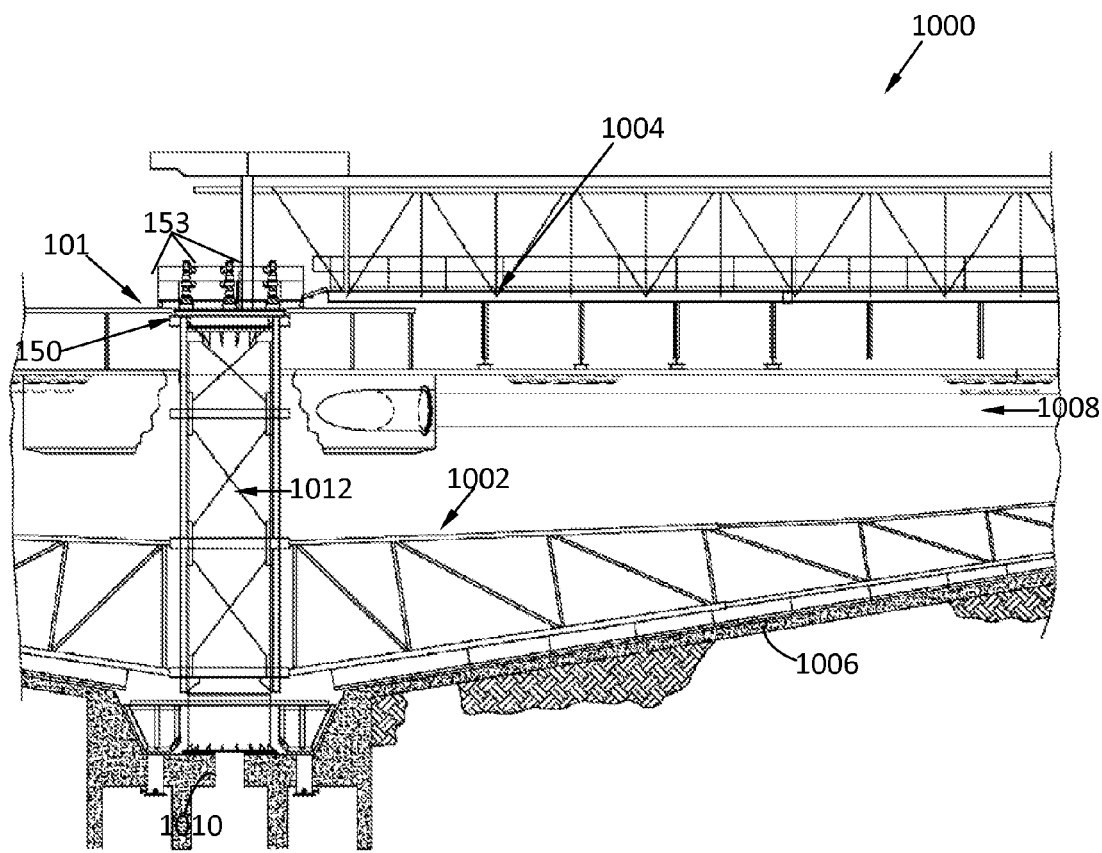
FIG. 8 is a schematic view of a sedimentation tank which may practice the invention according to some embodiments.

The base portion 36 of the drive 1 is connected to a stationary center pillar (such as the center pillar 1012 shown in FIG. 8). The base portion 36 further comprises an upwardly extending cylindrical outer rim portion 38 having a first seal lip 37 thereon. As the main ring gear 60, web portion 52, and cage 50 rotate as a unit, the first seal lip 37 prevents dirt and liquids from migrating into the drive 1. The cover plate 30 extends past the web portion 52 and comprises an overhanging annular seal ring 35 that extends downwardly from the cover plate 30. A second seal lip 57 extends upwardly from the cage 50 making contact with a lower portion of the cover plate 30, thereby preventing dirt and liquids from migrating into the drive 1.

A rake mount 51 is provided to the cage 50 for mounting a rake assembly such as the rake assembly 1002 shown in FIG. 8. Fasteners 84 mount the outer race 44 of the third bearing 40 directly to the main ring gear 60. Moreover, fasteners 82 mount the main ring gear 60 directly to the web portion 52. When the main ring gear 60 is loaded with high stresses by pinions 10 driven at high torques, its thin, annular shape makes it tend to warp or twist within the drive 1. Conversely, such warping and twisting due to high torsional stresses is resisted by the outer race 44 of the third bearing 40, since the third bearing 40 is specifically designed to resist such distortion. Accordingly, fasteners 84 holding the stiff outer race 44 to the somewhat flexible main ring gear 60 end up succumbing to failure at the interface between the gear 60 and the outer race 44. Failure(s) may be especially prevalent during "lock-ups" of reducers or other unforeseen control issues.

Figure 2:
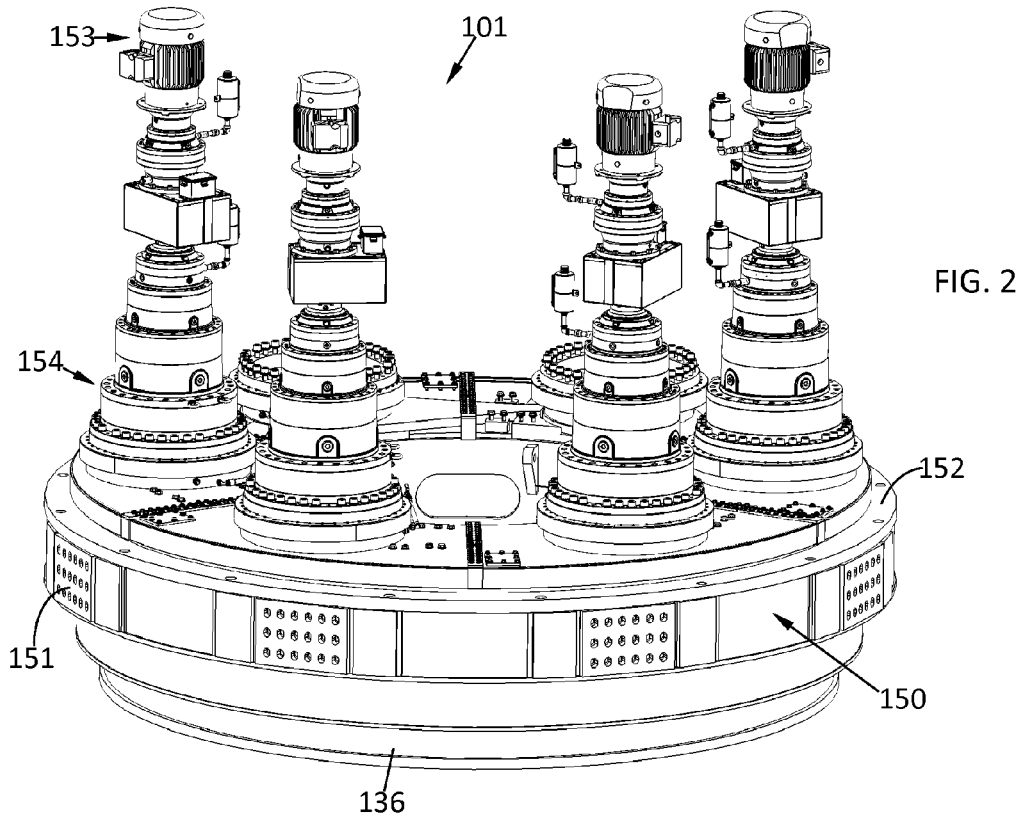
FIG. 2 is an isometric view of a sedimentation tank drive according to some embodiments.

FIG. 2 shows an isometric view of a drive 101 according to some embodiments of the invention. A base portion 136 is mounted to a stationary center pillar 1012. An outer cage 150 rotates with respect to both the base portion 136 and inner portion 139 of said base portion 136. The cage 150 has a plurality of rake mounts 151 provided thereon, to which a rake assembly 1002 such as the one shown in FIG. 8 is affixed. A plurality of motors 153 each having its own reducer 154 are provided around the drive 101. Each of the reducers 154 join to a cover plate 130 of the drive 101 via a reducer mount 131 extending upwardly from the cover plate 130.

Figure 3:
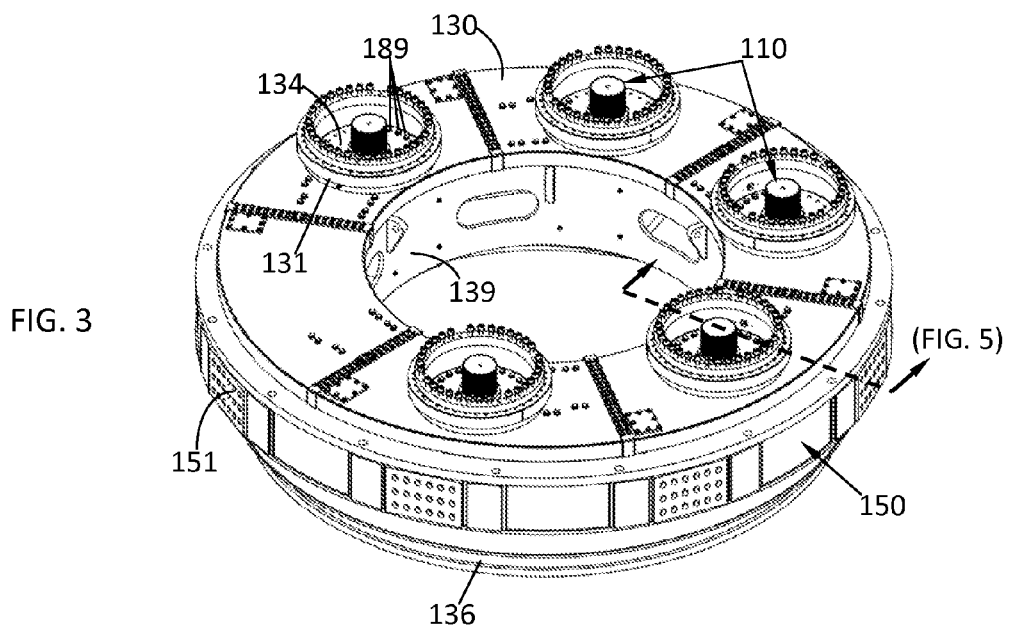
FIG. 3 is a partial view of the sedimentation tank drive shown in FIG. 2.

FIG. 3 shows a partial view of FIG. 2, with the motors 153 and reducers removed 154 for clarity. As shown, a pinion 110 is disposed within each reducer mount 131, and then an upper pinion contact adjuster plate 134 is disposed thereover. A plurality of fasteners 189 secure the upper pinion contact adjuster plate 134 to the rest of the base portion 136, and keep the pinion 110 disposed within the drive 101.

Figure 4:
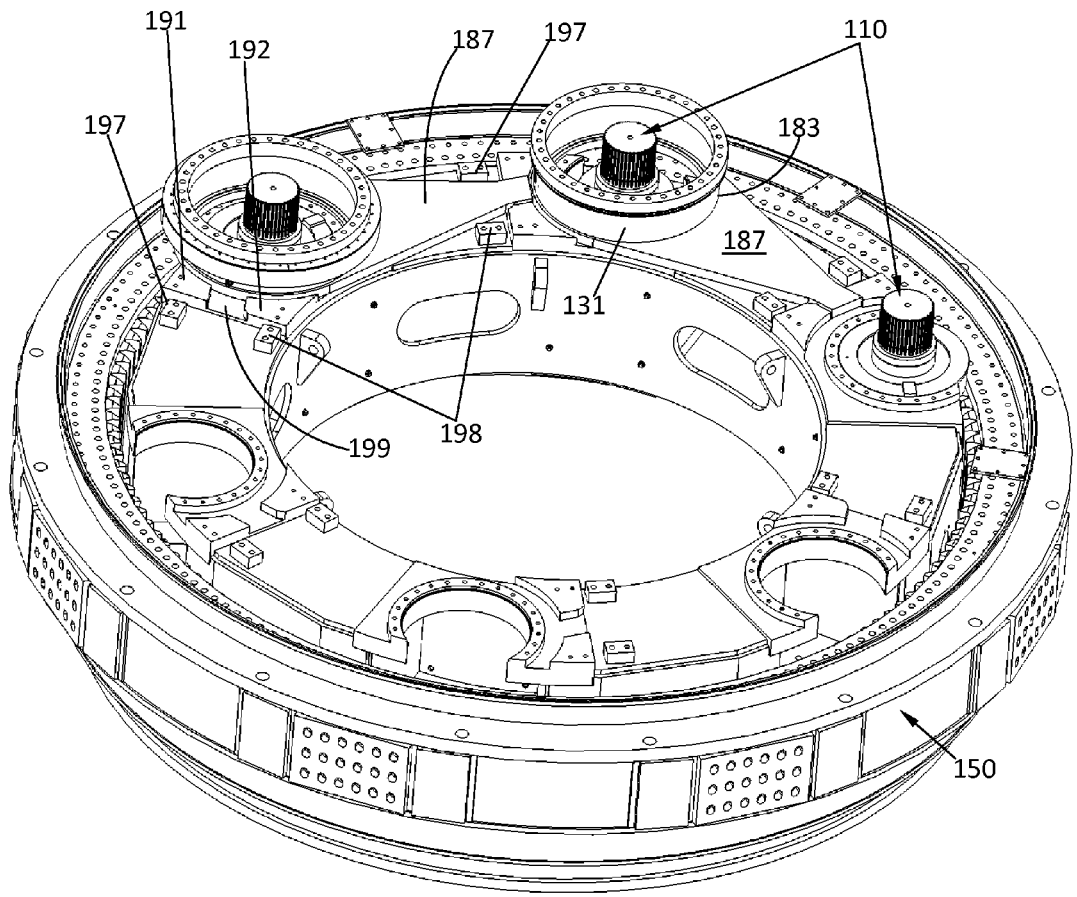
FIG. 4 is an even more partial view of the sedimentation tank drive shown in FIG. 2.

FIG. 4 shows an even more partial view of the sedimentation drive in FIG. 2. As shown, each reducer mount 131 may be provided in a floating configuration and having an elongated torque arm 187 provided thereon. The torque arm 187 may be attached to the reducer mount via a weld 183 as shown in the exemplary embodiment, or the torque arm 187 may otherwise be mounted to or form a portion of reducer mount 131 using fasteners or other means. The torque arm 187 generally allows constant contact adjustment to occur between a pinion 110 and the main ring gear 160 to provide optimal meshing. A distal end of the torque arm 187 may extend into an adjacent space, opening, or groove 199 defined between a first holding block 191 and a second holding block 192. Each torque arm 187 may be secured in an up-and-down direction, via the cover plate 130. The cover plate 130 rests against and secures to the first retainer mount 197 and the second retainer mount 198, thereby capturing the torque arm 187. During use, torque arm 187 allows small axial misalignments and radial displacements as if the main ring gear 160 during deflection, distortion, or deformation of said main ring gear 160.

Figure 5:
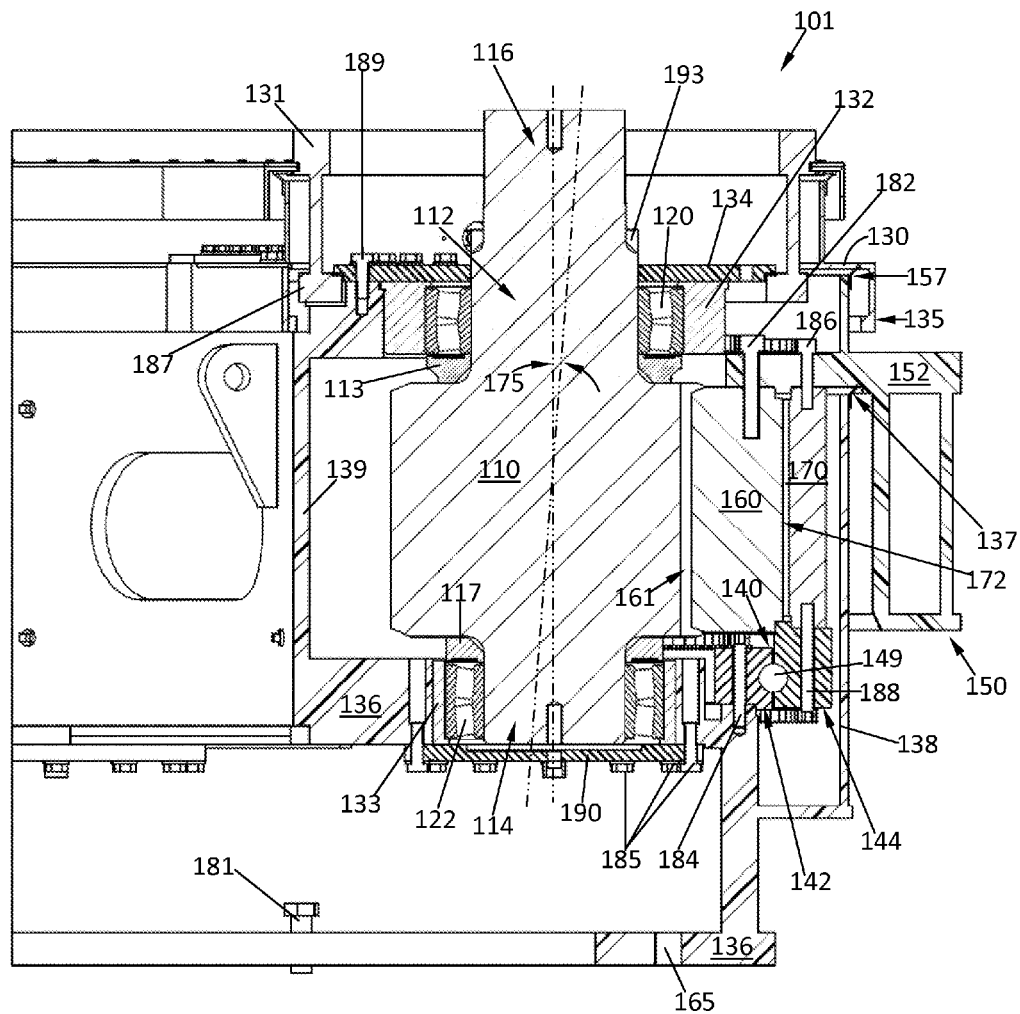
FIG. 5 is a detailed cross-sectional view of FIG. 3.

FIG. 5 is a cross-sectional view of the drive 101 of FIG. 3. The drive 101 comprises a pinion 110 which engages the teeth 166 of and drives a main ring gear 160 at a mesh zone 161. The pinion 110 may comprise an upper first spindle portion 112, a lower second spindle portion 114, and a torque surface 116 to which powered rotational input means (such as an electric motor 153 having a reducer 154) can apply a rotational input to the pinion 110. The pinion 110 rests in an upper first bearing 120 and a lower second bearing 122. A first packing washer 113 keeps the upper first bearing 120 in proper position and keeps rollers within the first bearing 120 from becoming unseated. A second packing washer 117 keeps the lower second bearing 122 in proper position and keeps rollers within the second bearing 122 from becoming unseated. An upper eccentric bearing block 132 seats the first bearing 120, and a lower eccentric bearing block 133 which is seated within the base portion 136 of the drive 101 houses the second bearing 122. The upper 132 and lower 133 eccentric bearing blocks each have offset bores which house the upper 120 and lower 122 bearings. In the particular example shown, the bores are offset approximately 0.015 inches; however, other offsets are anticipated. The blocks 132, 133, therefore, may be independently rotated in opposite directions, in order to offset an axis angle 175 or position of the pinion 110. Moreover, the pinion 110 may be positioned closer to or farther away from main ring gear 160 by rotating the upper and lower bearing blocks 132, 133 in the same direction, simultaneously. Further holding the pinion to the drive 101 is a lower pinion contact adjuster plate 190 which is secured to the base portion 136 (below the lower second spindle portion 114) via a plurality of fasteners 185.

As shown in FIGS. 3-7, a cover plate 130 provides an upper mounting surface to the drive 101. One or more reducer mounts 131 may be provided to the drive 101 to facilitate mounting of the powered rotation input means, for instance, a motor 153 with planetary reducer 154. A reducer abutment plate 193 may be used to limit the stopping depth of the reducer 154 and align the torque surface 116 with complimentary components (e.g., planet gears in the reducer 154). Reducer mounts 131 are connected to the base portion 136 via the pinion contact adjuster plate 134 which captures the mount 131 by fasteners 189. Also captured by pinion contact adjuster plate 134 is the upper eccentric bearing block 132, the upper first bearing 120, and the first packing washer 113. A web portion 152 which connects the main ring gear 160 to a cage 150 rotates with respect to the base portion 136 of the drive 101. The main ring gear 160 is operatively connected to the web portion 152, e.g., via a plurality of fasteners 182 which are inserted through apertures 196 in the web portion 152 and fastened to the main ring gear 160. A bearing transfer ring 170 is also operatively connected to the web portion 152, e.g., via a plurality of fasteners 186 which are inserted through apertures 195 in the web portion 152 and fastened to the bearing transfer ring 170. The bearing transfer ring 170 is also operatively connected to an outer race 144 of a third bearing 140, e.g., via a plurality of fasteners 188 which are inserted through apertures 141 in the outer race 144 and fastened to the bearing transfer ring 170. The outer race 144 communicates with an inner race 142, wherein a plurality of bearing rollers 149 are disposed between the inner 142 and outer 144 races. While not shown, the respective radial locations of inner 142 and outer 144 races may be reversed without necessarily departing from the scope of the invention. Accordingly, rollers 149 in the third bearing 140 may instead be located radially outwardly of the bearing transfer ring 170.

The base portion 136 of the drive 101 is connected to a stationary center pillar 1012 as will be appreciated by FIG. 8 by one or more fasteners 181 through holes 165. The center pillar 1012 does not move and generally serves to support a bridge 1004 and the torque loads generated by the drive. The base portion 136 further comprises an upwardly extending cylindrical outer rim portion 138 having a first seal lip 137 thereon. As the main ring gear 160, the web portion 152, the bearing transfer ring 170, and the cage 150 rotate as a unit, the first seal lip 137 prevents dirt and liquids from migrating into the drive 101. The cover plate 130 extends past the web portion 152 and comprises an overhanging annular seal ring 135 that extends downwardly from the cover plate 130. A second seal lip 157 extends upwardly from the web portion 152, making contact with at least one of a lower portion of the cover plate 130 and an inner portion of the overhanging annular seal ring 135, thereby preventing dirt and liquids from migrating into the drive 101.

In some instances, fasteners 182 may mount the main ring gear 160 directly or indirectly to the web portion 152. Similarly, fasteners 186 may mount the bearing transfer ring 170 directly or indirectly to the web portion 152. Furthermore, fasteners 184 may mount the outer race 144 of the third bearing 140 directly or indirectly to the bearing transfer ring 170. Lastly, fasteners 184 may mount the inner race 142 directly or indirectly to the base portion 136. A rake mount 151 may be provided to the cage 150 for mounting a rake assembly 1002 such as the one shown in FIG. 8. A gap 172 is provided between the main ring gear 160 and the bearing transfer ring 170 so that when the main ring gear 160 is loaded with high bending stresses B, its thin, annular shape can warp or twist within the drive 101 without imparting much fatigue or shear to fasteners 188 associated with the outer race 144. Accordingly, rather than fasteners 84 holding the stiff outer race 44 directly to the somewhat flexible main ring gear 60 as in the prior art, fasteners 188 hold the stiff outer race 144 to the bearing transfer ring 170. In this way, torque T may be delivered to the rake assembly 1002 via the web portion 152, and bending stresses B (e.g., tensile, compressive, shear, torsional) experienced by the main ring gear 160 and cage 150 may be transferred through the web portion 152 and bearing transfer ring 170, and then to the outer race 144 of the third bearing 140. Gap 172 may be one of any clearance which is greater than zero or greater than a press fit interface. For instance, in some non-limiting examples, gap 172 may be approximately 0.005 inches. In other non-limiting examples, gap 172 may be several millimeters. In yet even other non-limiting examples, gap 172 may comprise a clearance between the main ring gear 160 and outer race 144 which provides a very snug clearance fit. In yet even other non-limiting examples, gap 172 may comprise a clearance between the main ring gear 160 and outer race 144 which provides a very loose clearance fit. The gap 172 may also simply be a result of component configuration and/or tolerances within the drive 101.

Figure 6:
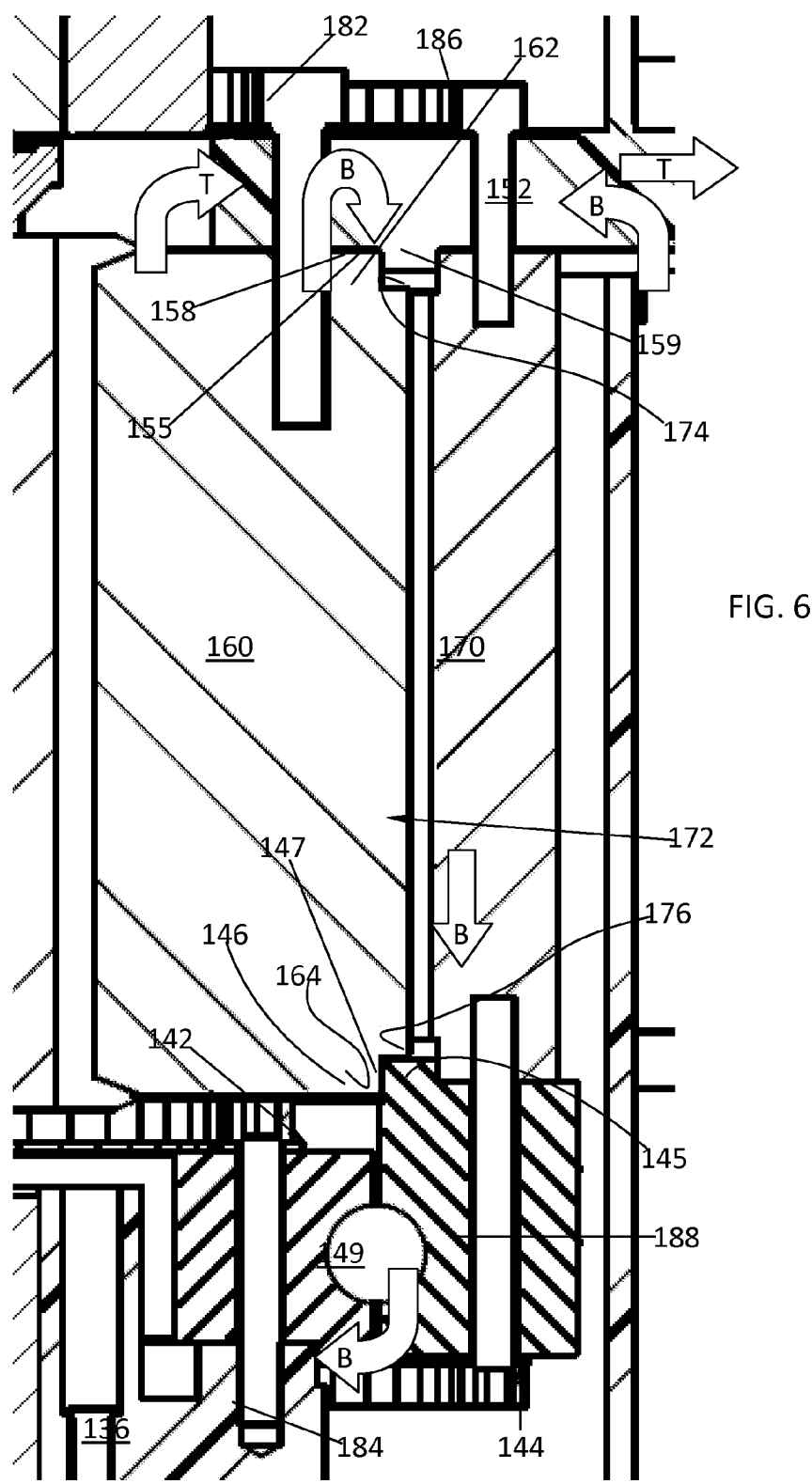
FIG. 6 is a detailed view showing the particulars of FIG. 5 and more clearly showing the function of a bearing transfer ring according to some embodiments.

Turning now to FIG. 6, a cross-section of drive 101 is shown. Main ring gear 160 may comprise a first mating portion 162 and a second mating portion 164 which serve to pilot/align the main ring gear 160 with respect to a spacer 155 provided to the web portion 152 and a spacer 147 provided to the outer race 144 of the third bearing 140. The spacers 147, 155 may be provided in the form of one or more protrusions or bosses (e.g., integral pins) circumferentially spaced from each other, an undulating or splined matching surface, or a continuous solid annular ring projection as shown. Spacer 155 may comprise a seventh mating portion 158 which is complimentary in shape and/or fit with the first mating portion 162 of the main ring gear 160. Spacer 147 may comprise a sixth mating portion 146 which is complimentary in shape and/or fit with the second mating portion 164 of the main ring gear 160. In the particular non-limiting embodiment shown, the first 162 and second 164 mating portions of the main ring gear 160 each comprise an annular circumferential shelf. In other embodiments, however, the first 162 and second 164 mating portions of the main ring gear 160 may alternatively comprise annular grooves, lips, undercuts, castellations, radially extending projections (e.g., pins), or other imaginable features which would serve as complimentary abutment means to bear against, fit within, or otherwise mate with the mating portions 146, 158 of spacers 147, 155.

In a similar fashion to the main ring gear 160, the bearing transfer ring 170 also comprises a third mating portion 174 and a fourth mating portion 176 which serve to pilot/align the bearing transfer ring 170 with respect to the spacer 155 provided to the web portion 152 and the spacer 147 provided to the outer race 144 of the third bearing 140. Spacer 155 may comprise an eighth mating portion 159 which is complimentary in shape and/or fit with the third mating portion 174 of the bearing transfer ring 170. Spacer 147 may comprise a fifth mating portion 145 which is complimentary in shape and/or fit with the fourth mating portion 176 of the bearing transfer ring 170. In the particular non-limiting embodiment shown, the third 174 and fourth 176 mating portions of the bearing transfer ring 170 each comprise an annular circumferential shelf. In other embodiments, however, the first 162 and second 164 mating portions of the main ring gear 160 may alternatively comprise annular grooves, lips, undercuts, radially extending projections (e.g., pins), or other features which would serve as complimentary abutment means to bear against, fit within, or otherwise mate with the mating portions 145, 159 of spacers 147, 155.

Figure 7:
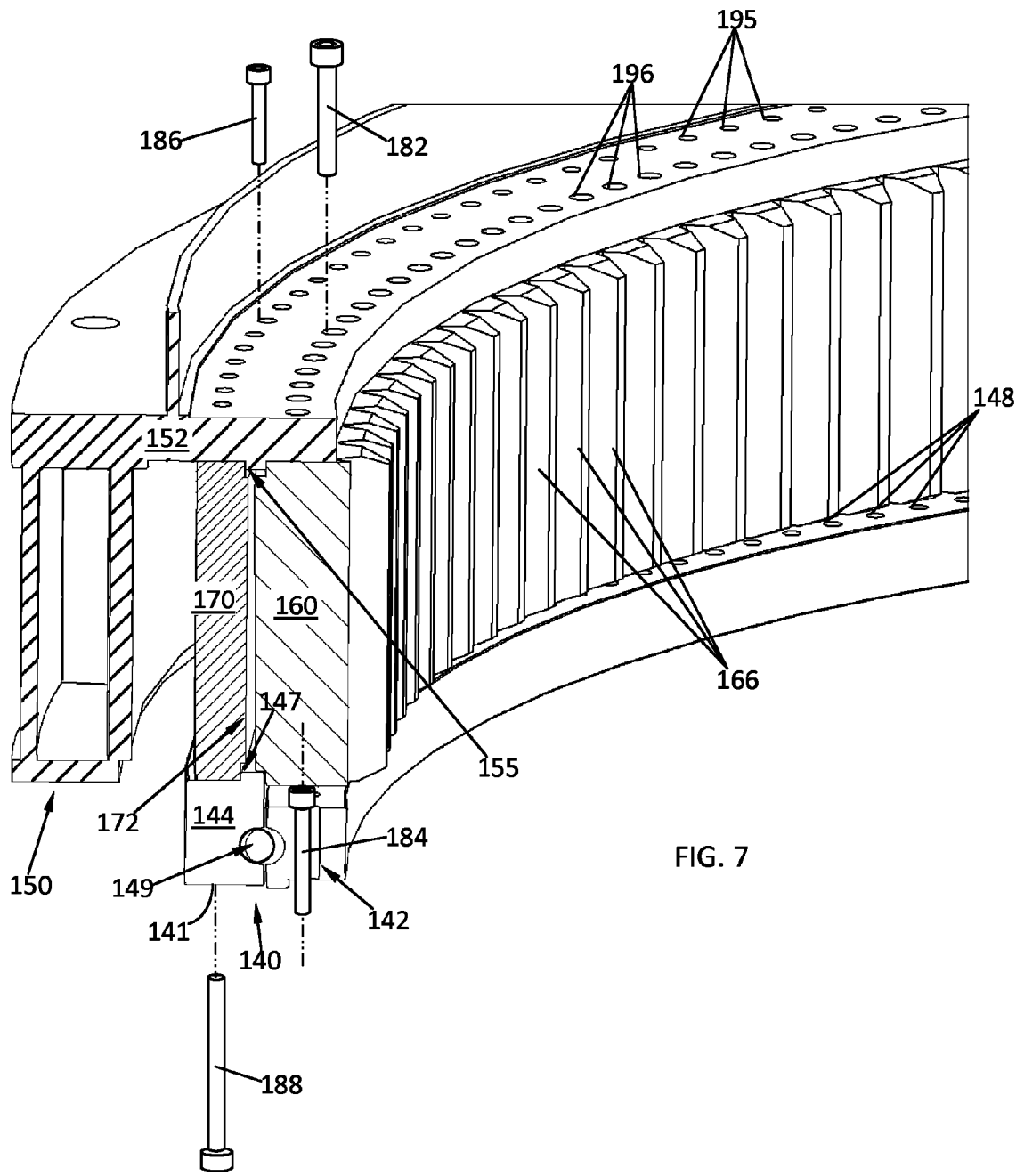
FIG. 7 is an isometric cross sectional view of certain components of a drive according to some embodiments.

FIG. 7 is a partially-exploded isometric cross-sectional view better illustrating select components of the drive 101 shown in FIGS. 2-5, and having some components of the drive 101 not shown for clarity. As shown, the inner race 142 of the third bearing 140 may comprise a set of apertures 148 which each receive a fastener 184 that is secured to a base portion 136 of the drive 101. Clearance between the main ring gear 160 and the inner race 142 may provide ample room for securement of the fasteners 184, including the head of each fastener, without physical interference from the rotating main ring gear 160. While not shown, fasteners 184 securing the inner race 142 of the third bearing 140 to the base portion 136 of the drive 101 may be countersunk within the inner race 142 or provided with low-profile geometries in order to provide additional clearance between the main ring gear 160 and the inner race 142. Fasteners 188 securing the outer race 144 of the third bearing 140 to the bearing transfer ring 170 are also afforded clearance from the base portion 136 of the drive 101 in order to prevent binding during rotation of the cage 150 with respect to the base portion 136.

FIG. 8 is a schematic view of an apparatus which may practice the invention according to various embodiments. A sedimentation tank 1000, which might comprise, for instance, a thickener/clarifier device comprises a tank bottom 1006, a feed for introducing slurry 1008, and a central lower outlet 1010 adapted for removing settled solids which precipitate over time. A rake assembly 1002, which is connected to the cage 150 of the drive 101, rotates with respect to the tank bottom 1006 and "scoops" sediment towards the central lower outlet 1010. A plurality of motors 153 having reducers 154 work to spin pinions 110 within the drive 101. The pinions 110 in turn, rotate the main ring gear 160 within the drive 101, which, in turn, provides the torque necessary to move the cage 150, and the rake assembly 1002 attached to the cage 150. The drive 101 may be mounted to a stationary center pillar 1012 that supports an access bridge 1004, or a bridge (not shown) that extends entirely across the sedimentation tank 1000.

A contractor or other entity may provide a sedimentation drive or install a sedimentation drive according to a process in whole, or in part, as shown and described. For instance, the contractor may receive a bid request for a project related to designing a sedimentation drive system, or the contractor may offer to design or provide such an apparatus or system for a client. The contractor may then provide, for example, any one or more of the devices or features thereof shown and/or described in the embodiments discussed above. The contractor may provide such devices by selling those devices or by offering to sell those devices. The contractor may provide various embodiments that are sized, shaped, and/or otherwise configured to meet the design criteria of a particular client or customer. The contractor may subcontract the fabrication, delivery, sale, or installation of a component or whole of the devices disclosed, or of other devices used to provide said devices. The contractor may also survey a site and design or designate one or more storage areas for stacking the material used to manufacture the devices. The contractor may also maintain, modify, replace, or upgrade the provided devices. The contractor may provide such maintenance or modifications by subcontracting such services or by directly providing those services or components needed for said maintenance or modifications, and in some cases, the contractor may modify an existing sedimentation drive, sedimentation tank, or other thickener/clarifier device with a "retrofit kit" to arrive at a modified drive or one or more components thereof which comprise one or more method steps, devices, or features of the designs discussed herein.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

REFERENCE NUMERAL LIST

| | |
|---|---|
| T | Torque output to rake assembly |
| B | Bending stress |
| 1 | Drive |
| 10 | Pinion |
| 12 | First spindle portion |
| 14 | Second spindle portion |
| 16 | Torque surface |
| 20 | First bearing |
| 22 | Second bearing |
| 30 | Cover plate |
| 31 | Reducer mount |
| 32 | Bearing block |
| 33 | Upper seat portion |
| 34 | Lower mounting portion |
| 35 | Overhanging annular seal ring |
| 36 | Base portion |
| 37 | First seal lip |
| 38 | Outer rim portion |
| 39 | Inner portion |
| 40 | Third bearing |
| 42 | Third bearing inner race |
| 44 | Third bearing outer race |
| 49 | Third bearing roller |
| 50 | Cage or shaft |
| 51 | Rake mount |
| 52 | Web portion |
| 57 | Second seal lip |
| 60 | Main ring gear |
| 61 | Mesh zone |
| 82 | Fastener, web portion to main ring gear |
| 84 | Fastener, main ring gear to third bearing outer race |
| 93 | Reducer abutment plate |
| 101 | Drive |
| 110 | Pinion |
| 112 | First spindle portion |
| 113 | First packing washer |
| 114 | Second spindle portion |
| 116 | Torque surface |
| 117 | Second packing washer |
| 120 | First bearing |
| 122 | Second bearing |
| 130 | Cover plate |
| 131 | Reducer mount |
| 132 | Upper eccentric bearing block |
| 133 | Lower eccentric bearing block |
| 134 | Upper pinion contact adjuster plate |
| 135 | Overhanging annular seal ring |
| 136 | Base portion |
| 137 | First seal lip |
| 138 | Outer rim portion |
| 139 | Inner portion |
| 140 | Third bearing |
| 141 | Set of apertures |
| 142 | second or inner race of the third bearing |
| 144 | first or outer race of the third bearing |
| 145 | Fifth mating portion |
| 146 | Sixth mating portion |
| 147 | Spacer |

-continued

REFERENCE NUMERAL LIST

| | |
|---|---|
| 148 | Set of apertures |
| 149 | Third bearing roller |
| 150 | Cage or shaft |
| 151 | Rake mount |
| 152 | Web portion |
| 153 | Motor |
| 154 | Reducer |
| 155 | Spacer |
| 156 | Shelf |
| 157 | Second seal lip |
| 158 | Seventh mating portion |
| 159 | Eighth mating portion |
| 160 | Main ring gear |
| 161 | Mesh zone |
| 162 | First mating portion |
| 164 | Second mating portion |
| 165 | Holes |
| 166 | Teeth |
| 170 | Bearing transfer ring |
| 172 | Radial gap between main ring gear and bearing transfer ring |
| 174 | Third mating portion |
| 175 | Axis angle |
| 176 | Fourth mating portion |
| 181 | Fastener, base portion to column or bridge |
| 182 | Fastener, web portion to main ring gear |
| 183 | Weld |
| 184 | Fastener, third bearing inner race to base portion |
| 185 | Fastener, lower pinion contact adjuster plate |
| 186 | Fastener, web portion to bearing transfer ring |
| 187 | Torque arm |
| 188 | Fastener, bearing transfer ring to third bearing outer race |
| 189 | Fastener, upper pinion contact adjuster plate to base portion |
| 190 | Lower pinion contact adjuster plate |
| 191 | First holding block |
| 192 | Second holding block |
| 193 | Reducer abutment plate |
| 195 | First set of apertures |
| 196 | Second set of apertures |
| 197 | First retainer mount |
| 198 | Second retainer mount |
| 199 | Space/opening/groove |
| 1000 | Sedimentation tank/thickener/clarifier |
| 1002 | Rake assembly |
| 1004 | Bridge |
| 1006 | Tank bottom |
| 1008 | Slurry |
| 1010 | Central lower outlet |
| 1012 | Center pillar |

The invention claimed is:

1. A drive (101) for a sedimentation tank (1000) comprising:
   A main ring gear (160) operatively connected to a cage or shaft (150) via a web portion (152); a bearing transfer ring (170) provided to the web portion (152); and,
   a gap (172) provided between the bearing transfer ring (170) and the main ring gear (160);
   wherein the bearing transfer ring (170) is connected to a first bearing race (144);
   and, wherein the main ring gear (160) is configured to bear against the first bearing race (144).

2. The drive (101) according to claim 1, wherein the first bearing race (144) is in operable communication with a second bearing race (142), and wherein the second bearing race (142) is mounted to a base portion (136) of the drive (101).

3. The drive (101) according to claim 1, wherein the main ring gear (160) comprises a mating portion (162) which abuts a complimentary mating portion (158) of a spacer (155).

4. The drive (101) according to claim 1, wherein at least one spacer (147, 155) is provided on the web portion (152) and/or the first bearing race (144) and positioned between a portion of the main ring gear (160) and a portion of the bearing transfer ring (170), wherein the at least one spacer (147, 155) maintains an upper and/or lower portion of the gap (172) between the main ring gear (160) and the bearing transfer ring (170) during deflection, distortion, or deformation of the main ring gear (160).

5. The drive (101) according to claim 1, wherein the first bearing race (144) comprises a mating portion (145) which abuts a complimentary mating portion (176) provided on the bearing transfer ring (170), thereby maintaining a lower portion of the gap (172) between the main ring gear (160) and the bearing transfer ring (170) during deflection, distortion, or deformation of the main ring gear (160).

6. The drive (101) according to claim 1, wherein a mating portion (164) of the main ring gear (160) abuts a mating portion (146) of the first bearing race (144) which is in operable communication with the first bearing race (144), thereby maintaining a lower portion of the gap (172) between the main ring gear (160) and the bearing transfer ring (170) during deflection, distortion, or deformation of the main ring gear (160).

7. The drive (101) according to claim 1, further comprising one or more of the following elements for maintaining an optimal meshing between a pinion (110) and the main ring gear (160): at least one eccentric bearing block (132, 133), at least one contact adjuster plate (134, 190), or at least one torque arm (187).

8. The drive (101) according to claim 1, wherein the web portion (152) comprises at least one set of apertures (195, 196) configured to receive fasteners (182, 186) which either connect the bearing transfer ring (170) to the web portion (152) or connect the main ring gear (160) to the web portion (152).

9. The drive (101) according to claim 1, wherein the first bearing race (144) comprises a set of apertures (141) configured to receive fasteners (188) which connect the first bearing race (144) to the bearing transfer ring (170), or a second bearing race (142) operatively communicating with the first bearing race (144) comprises a set of apertures (148) configured to receive fasteners (184) which connect the second bearing race (142) to a base portion (136) of the drive (101).

10. A method of thickening/clarifying slurry (1008) comprising:
   providing a drive (101) which is operatively connected to a rake assembly (1002) via a cage or shaft (150); wherein the drive (101) comprises a main ring gear (160) operatively connected to the cage or shaft (150) via a web portion (152); wherein a bearing transfer ring (170) is provided to the web portion (152) such that a gap (172) is formed between the bearing transfer ring (170) and the main ring gear (160); wherein the bearing transfer ring (170) is connected to a first bearing race (144); and, wherein the main ring gear (160) is configured to bear against the first bearing race (144);
   providing power to the drive (101) thereby subjecting the main ring gear (160) to torque (T) and bending (B) stresses;
   transferring an amount of said torque (T) to the cage or shaft (150) in order to move the rake assembly (1002) connected thereto; and
   transferring an amount of said bending stresses to the bearing transfer ring (170) and the first bearing race (144) during deflection, distortion, or deformation of the main ring gear (160).

* * * * *